US010129255B1

United States Patent
Gan et al.

(10) Patent No.: US 10,129,255 B1
(45) Date of Patent: *Nov. 13, 2018

(54) DEVICE AUTHENTICATION WITH MAC ADDRESS AND TIME PERIOD

(71) Applicant: International Business Machines Corporation, Armonk, NY (US)

(72) Inventors: Seng C. Gan, Ashburn, VA (US); Gregg M. Talewsky, Branchburg, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/593,473

(22) Filed: May 12, 2017

(51) Int. Cl.
*H04L 29/06* (2006.01)
*H04L 29/12* (2006.01)

(52) U.S. Cl.
CPC .......... *H04L 63/0876* (2013.01); *H04L 63/10* (2013.01); *H04L 63/20* (2013.01); *H04L 61/6022* (2013.01)

(58) Field of Classification Search
None
See application file for complete search history.

(56) References Cited

U.S. PATENT DOCUMENTS

| 8,495,714 | B2 | 7/2013 | Jones et al. | |
|---|---|---|---|---|
| 8,745,691 | B1* | 6/2014 | Vassilev | H04L 12/5692 726/1 |
| 9,125,055 | B1 | 9/2015 | Jones et al. | |
| 2010/0100646 | A1* | 4/2010 | Park | H04L 12/413 710/8 |
| 2012/0263066 | A1* | 10/2012 | Hurwitz | H04L 12/413 370/252 |
| 2012/0314672 | A1 | 12/2012 | Chen | |
| 2013/0024915 | A1 | 1/2013 | Jones et al. | |

(Continued)

FOREIGN PATENT DOCUMENTS

| CN | 103501495 A | 1/2014 |
|---|---|---|
| CN | 105429985 A | 3/2016 |
| WO | 2013041882 A2 | 3/2013 |

OTHER PUBLICATIONS

Gan et al., "Device Authentication With Mac Address and Time Period", U.S. Appl. No. 15/884,548, filed Jan. 31, 2018, 30 pages.

(Continued)

*Primary Examiner* — Michael R Vaughan
(74) *Attorney, Agent, or Firm* — Jose A. Medina-Cruz; William H. Hartwell

(57) ABSTRACT

In an approach to device authentication, one or more processors receive a security policy comprising at least a first media access control ("mac") address and a corresponding time period for determining network access for a device. One or more processors receive a second mac address and a corresponding time of connection of the second mac address for authentication of the device. One or more processors determine the second mac address is the first mac address and, responsive to determining the second mac address is the first mac address, one or more processors determine to grant network access to the device based on whether the time of connection of the second mac address is within the time period.

17 Claims, 4 Drawing Sheets

(56) References Cited

U.S. PATENT DOCUMENTS

| | | | |
|---|---|---|---|
| 2015/0281167 A1* | 10/2015 | Seddon | H04W 4/021 |
| | | | 370/331 |
| 2016/0270118 A1 | 9/2016 | He et al. | |
| 2016/0337313 A1 | 11/2016 | Wood | |
| 2017/0006039 A1 | 1/2017 | Ernohazy et al. | |
| 2017/0034072 A1 | 2/2017 | Jia et al. | |
| 2017/0034776 A1* | 2/2017 | Hou | H04W 12/08 |
| 2017/0187703 A1 | 6/2017 | Enrique Salpico | |

OTHER PUBLICATIONS

IBM, Appendix P, List of IBM Patents or Patent Applications Treated As Related, dated Jan. 31, 2018, 2 pages.

Kothmayr et al., "DTLS based Security and Two-Way Authentication for the Internet of Things", Preprint accepted to Elsevier Journal of AdHoc Networks in May 2013, Preprint submitted to Ad Hoc Networks Apr. 8, 2013, Journal version: http://dx.doi.org/10.1016/j.adhoc.2013.05.003, pp. 1-27.

Mahalle et al., "Identity Authentication and Capability Based Access Control (IACAC) for the Internet of Things", Center for TeleInFrastruktur, Aalborg University, Aalborg, Denmark, Received Sep. 15, 2012, Accepted Feb. 17, 2013, Journal of Cyber Security and Mobility, vol. 1, 309-348, © 2013 River Publishers.

* cited by examiner

DEVICE AUTHENTICATION WITH MAC ADDRESS AND TIME PERIOD

BACKGROUND OF THE INVENTION

The present invention relates generally to the field of computer security, and more particularly to network device authentication.

Computer security refers to the protection from theft, damage, or disruption of computer systems and networks, including hardware, software, and the data those systems store or access. Computer security strives to minimize risks in computer systems, reduce threats to computer systems through deterrence, prevent threats against computer systems, detect any threats against computer systems, and provide recovery mechanisms if the computers systems are compromised.

The proliferation of embedded computing devices in everyday objects has enabled unparalleled connectivity of devices, including electronics, software, sensors, and actuators, among others, in computer networks. The term Internet of Things ("IoT") is used to refer to this dynamic network of globally connected things, entities, devices, items, or objects. As such, IoT can include, without limitation, a company or enterprise in which numerous items are communicatively interconnected such as computers, mobile devices (e.g., phones, laptops or tablets), lighting and climate control systems, cars or other vehicles and "smart" appliances (e.g., refrigerators, televisions) where some or all of those devices can be controlled or interacted with remotely.

SUMMARY

Embodiments of the present invention disclose a method, a computer program product, and a system for device authentication by mac address and time period. The method may include one or more processors receiving a security policy comprising at least a first media access control ("mac") address and a corresponding time period for determining network access for a device. One or more processors receive a second mac address and a corresponding time of connection of the second mac address for authentication of the device. One or more processors determine the second mac address is the first mac address and, responsive to determining the second mac address is the first mac address, one or more processors determine to grant network access to the device based on whether the time of connection of the second mac address is within the time period.

DETAILED DESCRIPTION

Network security mechanisms are essential to maintain the confidentiality, integrity, and availability of the devices and data in any network. IoT devices are placing new demands on both wired and wireless networks because IoT devices can be lax in following standard access control protocols such as IEEE 802.1x or data encryption protocols or to support a universal access method ("UAM"). Therefore, verification of identity of IoT devices, such as sensors and other types of devices, is necessary to maintain network security.

To overcome these challenges, embodiments of the present invention recognize that Media Access Control ("mac") addresses of a device may be registered by an authorized user to increase security of the network. Embodiments of the present invention further recognize that specifying a time period for the connection of the device may further increase the security of the network by providing certainty that the device should be permitted network access. Embodiments of the present invention also recognize that using multiple mac addresses for device authentication further increases the certainty of the disclosed security features. Although the disclosure is particularly advantageous for IoT devices, embodiments of the present invention also recognize that any device having network access capabilities may be authenticated as disclosed herein. Implementation of embodiments of the invention may take a variety of forms, and exemplary implementation details are discussed subsequently with reference to the Figures.

Figure 1:
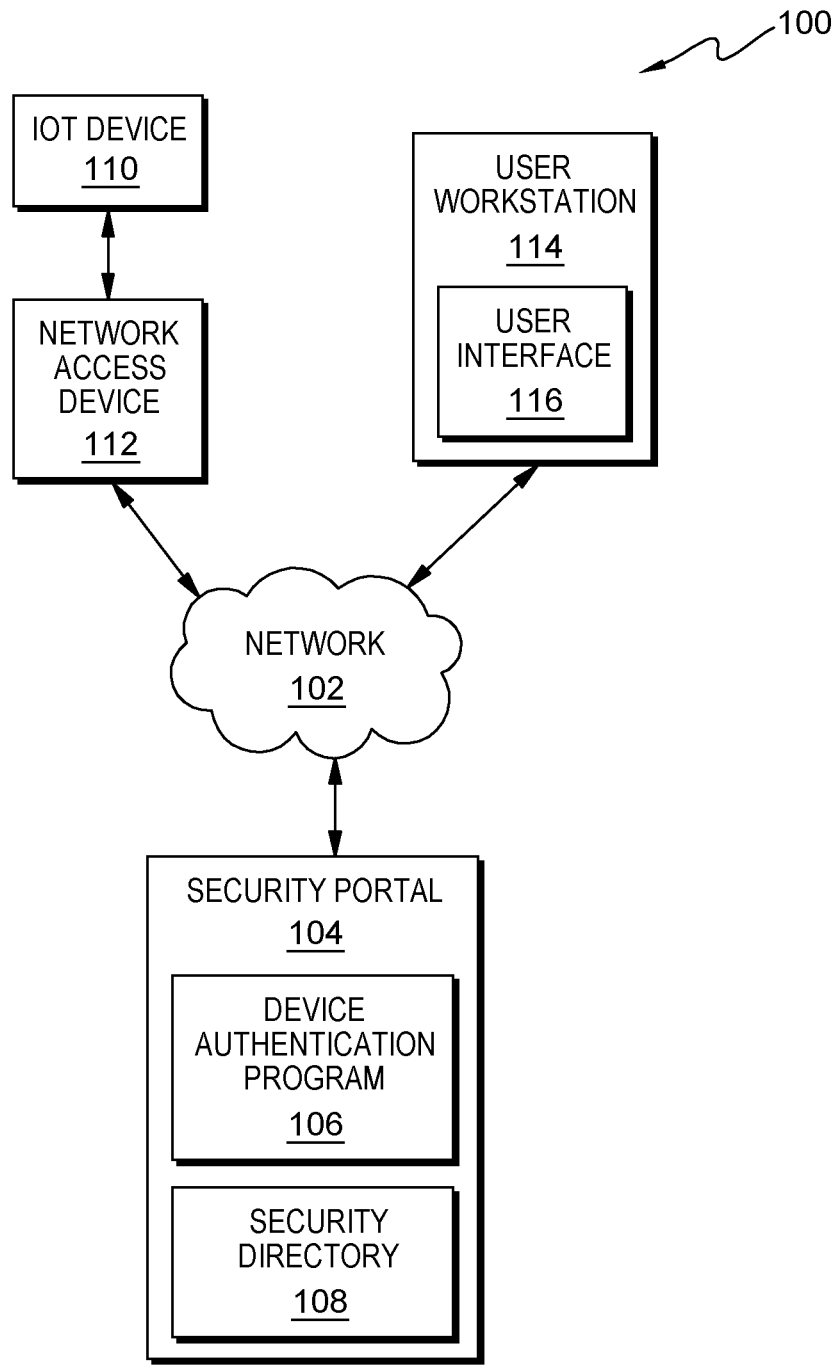
FIG. 1 is a functional block diagram illustrating a device authentication environment, in accordance with an embodiment of the present invention.

FIG. 1 is a functional block diagram illustrating a distributed data processing environment, generally designated 100, in accordance with an embodiment of the present invention. The term "distributed" as used in this specification describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes security portal 104, IoT device 110, network access device 112 ("NAD"), and user workstation 114, all interconnected over network 102.

In general, network 102 can be any combination of connections and protocols that will support communications between security portal 104, IoT device 110, network access device 112, user workstation 114, and other computing devices (not shown) within distributed data processing environment 100. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that can receive and transmit data, voice, and/or video signals, including multimedia signals that include voice, data, and video information. Network access device 112 may be any device used for providing IoT device 110 access to network 102.

User workstation 114 enables a user to log-in to device authentication program 106 to register a mac address and time period for an IoT device. In some embodiments of the present invention, user workstation 114 is a device that performs programmable instructions. For example, user workstation 114 can be a laptop computer, a tablet computer, a smart phone, or any programmable electronic mobile device capable of communicating with various components and devices within distributed data processing environment 100, via network 102. In general, user workstation 114 represents any programmable electronic mobile device or combination of programmable electronic mobile devices capable of executing machine readable program instructions and communicating with other computing devices (not shown) within distributed data processing environment 100 via a network, such as network 102. User workstation 114 includes an instance of user interface 116.

User interface 116 provides an interface to device authentication program 106 on security portal 104 for a user of user workstation 114. In some embodiments of the present invention, user interface 116 may be a graphical user interface (GUI) or a web user interface (WUI) and can display text, documents, web browser windows, user options, application interfaces, instructions for operation, and include the information (such as graphic, text, and sound) that a program presents to a user and the control sequences the user employs to control the program. In other embodiments, user interface 116 may also be mobile application software that provides an interface between a user of user workstation 114 and security portal 104. Mobile application software, or an "app," is a computer program designed to run on smart phones, tablet computers and other mobile devices. User interface 116 enables the user of user workstation 114 to register a mac address and time period for an IoT device. In accordance with some embodiments, users register a mac address and time period for an IoT device by interaction with user interface 116, which may include touch screen devices, audio capture devices, and other types of user interfaces. In other embodiments, user interface 116 may be an external device operatively connected to user workstation 114 via near-field communication or other types of wired and/or wireless technologies.

Security portal 104 includes device authentication program 106 and security directory 108. In some embodiments of the present invention, device authentication program 106 comprises a web portal that allows authorized users to input a mac address and time period information for registration of the device. In other embodiments, device authentication program 106 receives a security policy based on a time period. For example, a user may log in to device authentication program 106 by providing user credentials, such as a username and password or any other appropriate credentials, to register a new device. Device authentication program 106 may enable the user to register the mac address of the device the user wants permitted onto the network as well as the time period during which the device will be allowed to connect to the network. Device authentication program 106 may receive a time period as a predefined window (e.g., "Monday Apr. 17, 2017 between 9 am-11 am") or a time period that enters into effect immediately for a predefined time window (e.g., "effective immediately for 120 seconds," "effective immediately for 60 minutes," or any other appropriate time window). In general, the time period may be any suitable time period such as certain times of day (e.g., between 9 and 11), certain days of the week (e.g., "Tuesday" or "Monday and Thursday"), certain time of the hour (between :10 and :15), and/or a time period that starts immediately (e.g., the next 20 minutes). Device authentication program 106 may also receive a list of permitted network access devices. The list of permitted network access devices may include identification of specific network access devices (e.g., serial number, mac address, or other appropriate identifier), identification of one or more locations (e.g., room or building numbers), or identification of one or more geographies (e.g., city or country), among other appropriate identifiers of the network access devices or the location where the device is allowed to connect (e.g., "effective immediately for 120 seconds in Armonk, N.Y., USA"). Device authentication program 106 may also receive additional fields as appropriate (e.g., requesting user, type of device, network access needed by subnet and/or Internet, among others). Device authentication program 106 may use all the registration information, including the additional fields, to establish an audit or accountability trail for use in case the security of the device becomes compromised later. Device authentication program 106 may also comprise an identity and access control policy platform to manage identity-based, role-based, and host-based authentication policies. In some embodiments, device authentication program 106 determines network access is granted to a device for all future connections based on implementation of a security policy for initial connectivity within a predefined time period. In other embodiments, device authentication program 106 determines network access is granted to a device only for the time period specified in the security policy. Device authentication program 106 may have its own internal storage (not shown) or may store and retrieve security policies from security directory 108.

Security directory 108 may be any service useful for storage and retrieval of directory information. In some embodiments of the present invention, security directory 108 stores the security policy, including the mac address and the time period. Security directory 108 may also store any additional fields (e.g., requesting user, type of device, network access needed by subnet and/or Internet, among others) to establish an audit or accountability trail for use in case the security of the device becomes compromised later. Device authentication program 106 may store and retrieve security policies and any other information stored in security directory 108 for the purposes of authenticating IoT device 110.

Security portal 104 can be a standalone computing device, a management server, a web server, a mobile computing device, or any other electronic device or computing system capable of receiving, sending, and processing data. In other embodiments, security portal 104 can represent a server computing system utilizing multiple computers as a server system, such as in a cloud computing environment. In another embodiment, security portal 104 can be a laptop computer, a tablet computer, a netbook computer, a personal computer (PC), a desktop computer, a personal digital assistant (PDA), a smart phone, or any other programmable electronic device capable of communicating with IoT device 110, network access device 112, user workstation 114, and other computing devices (not shown) within distributed data processing environment 100 via network 102. In another embodiment, security portal 104 represents a computing system utilizing clustered computers and components (e.g., database server computers, application server computers, etc.) that act as a single pool of seamless resources when accessed within distributed data processing environment 100. Security portal 104 may include internal and external hardware components, as depicted and described in further detail with respect to FIG. 4.

Figure 2:
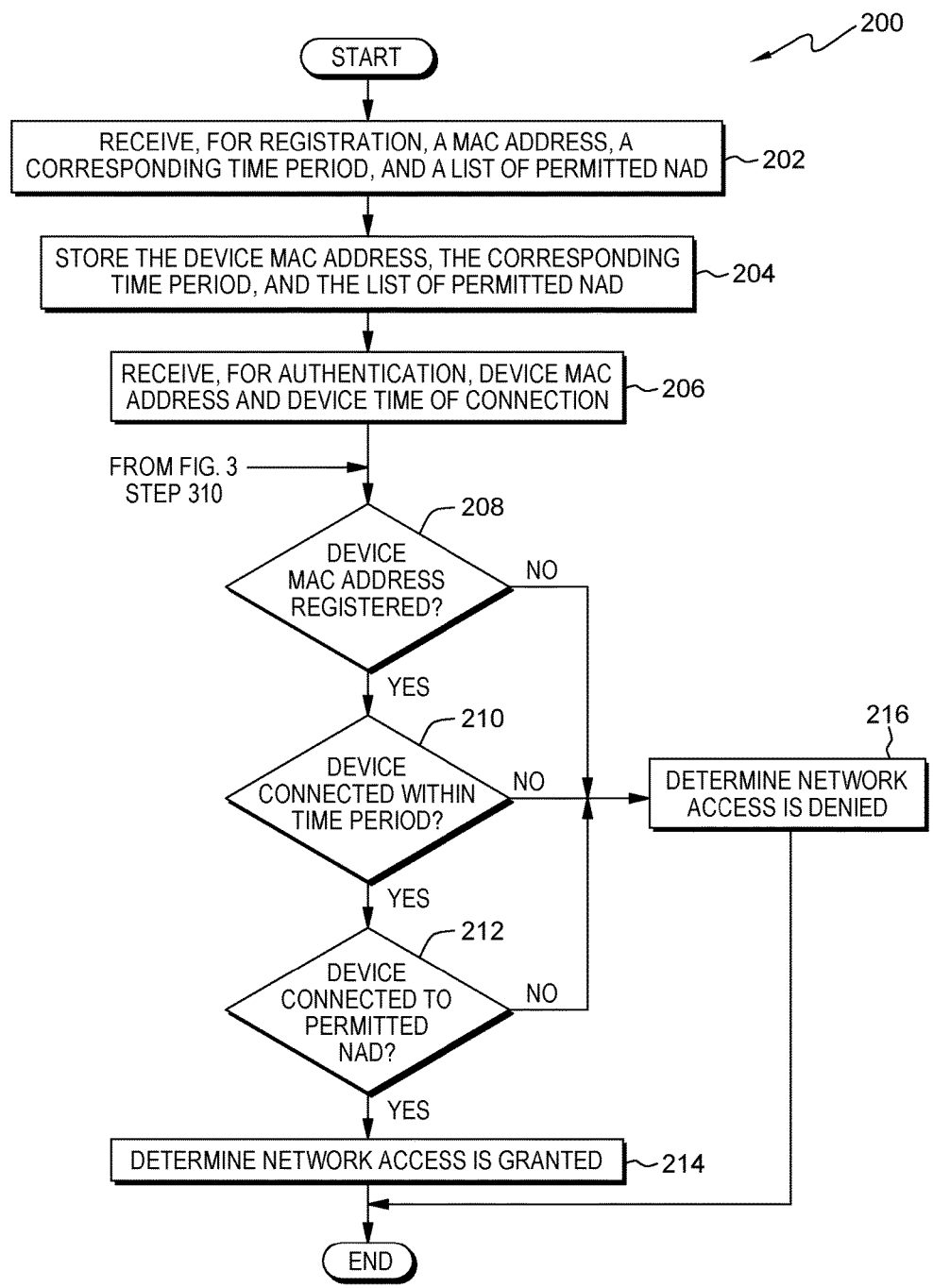
FIG. 2 is a flowchart depicting operational steps of a device authentication program, on a server computer within the distributed data processing environment of FIG. 1, in accordance with an embodiment of the present invention.

FIG. 2 depicts flowchart 200, illustrating operational steps of device authentication program 106, operating on security portal 104, within distributed data processing environment 100 of FIG. 1, in accordance with an embodiment of the present invention.

Device authentication program 106 receives a mac address, a corresponding time period, and a list of permitted network access devices for registration of a device (step 202). In some embodiments of the present invention, device authentication program 106 receives the mac address and time period information to register a security policy that establishes trust of the provided mac address only if it appears on the network within the time period. In other embodiments, device authentication program 106 may also receive a list of permitted network access devices to register a security policy that establishes trust of the provided mac address only if it appears on one of the permitted network access devices within the time period. In some embodiments, the list of permitted network access devices may include identification of the specific network access device (e.g., serial number, mac address, or other appropriate identifier), identification of one or more locations (e.g., room or building numbers), or identification of one or more geographies (e.g., city or country), among other appropriate identifiers of the network access device or the location where the device is allowed to connect. In other embodiments, device authentication program 106 receives a unique identifier and corresponding time period information for registration of a device. For example, unique identifiers may include a mac address, a uniform resource identifier (UID), a universally unique identifier (UUID), a near-field communication (NFC) unique identifier, a wireless power identification (WPID) unique identifier, or any other identifier that may be used to uniquely identify a device. In yet other embodiments, device authentication program 106 may also receive additional fields as appropriate (e.g., requesting user, type of device, network access needed by subnet and/or Internet, among others). In yet other embodiments, device authentication program 106 may use all the registration information, including the additional fields, to establish an audit or accountability trail for use in case the security of the device becomes compromised later.

Device authentication program 106 stores the mac address, the corresponding time period, and the list of permitted network access devices for registration of the device (step 204). In some embodiments of the present invention, device authentication program 106 may store the registration information, including the mac address, the time period, and the list of permitted network access devices, in an internal database or storage (not shown). In other embodiments, device authentication program 106 may register the mac address and time period information for host-based authentication in security directory 108.

Device authentication program 106 receives a device mac address, a time of connection of the device, and an identifier of a network access device for authentication (step 206). In some embodiments of the present invention, once the device is connected to the network, the mac address and the time of connection of the device are sent to device authentication program 106 to determine whether the device should be allowed on the network. In some embodiments, network access device 112 receives the mac address of the device when the device is connected, determines a time of connection of the device, and sends the mac address of the device and the time of connection of the device to device authentication program 106. In other embodiments, device authentication device 106 receives an identifier of the network access device 112 to which the device was connected. In this and other embodiments, the identifier of the network access device may include an identifier of the specific network access device (e.g., serial number, mac address, or other appropriate identifier), identification of one or more locations (e.g., room or building numbers), or identification of one or more geographies (e.g., city or country), among other appropriate identifiers of the network access device or the location where the device was connected. In yet other embodiments, device authentication program 106 may perform host-based authentication based on the mac address and time of connection of the device according to the time period established in the security policy.

Device authentication program 106 determines whether the mac address of the device is registered (step 208). In some embodiments of the present invention, device authentication program 106 verifies that the mac address of the device has been previously registered. For example, device authentication program 106 may search entries in a disk storage (not shown) or may query a database such as security directory 108 to retrieve the registration information associated with the mac address. If the mac address is not registered, device authentication program 106 continues execution to determine network access is denied (step 206, "NO" branch). If the mac address is registered, device authentication program 106 continues execution to determine whether network access should be granted to the device (step 206, "YES" branch).

Device authentication program 106 determines whether the time of connection of the device is within the time period (step 210). In some embodiments of the present invention, device authentication program 106 compares the time of connection of the device with the time period set in the security policy. If the time of connection of the device does not match the time period, device authentication program 106 continues execution to determine network access is denied (step 208, "NO" branch). For example, given a security policy with time period of "Apr. 17, 2017 between 9 am-11 am" and given a time of connection of the device of "Apr. 17, 2017 12:31 pm," device authentication program 106 continues execution to determine network access is denied to the device. If the time of connection of the device matches the time period, device authentication program 106 continues execution to determine network access is granted (step 208, "YES" branch). For example, given a security policy with time period of "Apr. 17, 2017 between 9 am-11 am" and given a time of connection of the device of "Apr. 17, 2017 9:30 am," device authentication program 106 continues execution to determine network access is granted to the device.

Device authentication program 106 determines whether the identifier of the network access device is in the list of permitted network access devices (step 212). In some embodiments of the present invention, device authentication program 106 compares the identifier of the network access device with the list of permitted network access devices set in the security policy. If the identifier of the network access device does not match the list of permitted network access devices, device authentication program 106 continues execution to determine network access is denied (step 208, "NO" branch). For example, given a security policy with list of permitted network access devices of "Armonk, N.Y., USA" and given an identifier of the network access device of "Markham, Ontario, CA," device authentication program 106 continues execution to determine network access is denied to the device. If the identifier of the network access device matches the list of permitted network access devices, device authentication program 106 continues execution to determine network access is granted (step 208, "YES" branch). For example, given a security policy with list of permitted network access devices of "Armonk, N.Y., USA" and given an identifier of the network access device of "Armonk," device authentication program 106 continues execution to determine network access is granted to the device.

Device authentication program 106 determines network access is granted (step 214). In some embodiments of the present invention, device authentication program 106 allows devices on the network only if the devices are registered and the time of connection of the device is within the time period set in the security policy. For example, if the user connects the registered device within the specified time window, the device may be permitted on the network by network access device 112 and appropriate access control may be applied. In other embodiments, device authentication program 106 allows devices on the network only if the devices are registered, the time of connection of the device is within the time period set in the security policy, and the devices are connected in a network access device listed in the security policy. In some embodiments, device authentication program 106 determines network access is granted to a device for all future connections based on implementation of a security policy for initial connectivity. For example, a security policy for initial connectivity may require a user of the device to connect the device to the network for the first time within a predefined time period. In these cases, the device will still be authorized to access the network after the time period expires. In other embodiments, network access is granted to the device only within the time period. In these cases, the device will be denied access to the network after the time period expires even if the time of connection for initial connectivity was within the time period set in the security policy.

Device authentication program 106 determines network access is denied (step 216). Device authentication program 106 denies network access to unregistered devices. In some embodiments of the present invention, device authentication program 106 also denies network access to devices where the required mac address for authentication was not connected to the network within the time period set in the security policy. In other embodiments, device authentication program 106 denies network access to devices where the required mac address for authentication was not connected to the network within the time period set in the security policy or the device was connected to a network access device not listed in the security policy. As explained above, in some embodiments, device authentication program 106 determines network access based on implementation of a security policy for initial connectivity. In these cases, the device will only be authenticated for the network based on the first time that the device is connected to the network. In other embodiments, device authentication program 106 may mark the device as known and future access controls may be applied as needed. In yet other embodiments, if a registered device connects to the network outside of the time period set in the security policy, device authentication program 106 may deny network access until the device is re-registered. For example, if the time period expires or the device is connected prematurely, device authentication program 106 may issue a deny message and the device may need to be registered again. In still other embodiments, network access is denied after the time period expires even if the initial time of connection of the device was within the time period.

Figure 3:
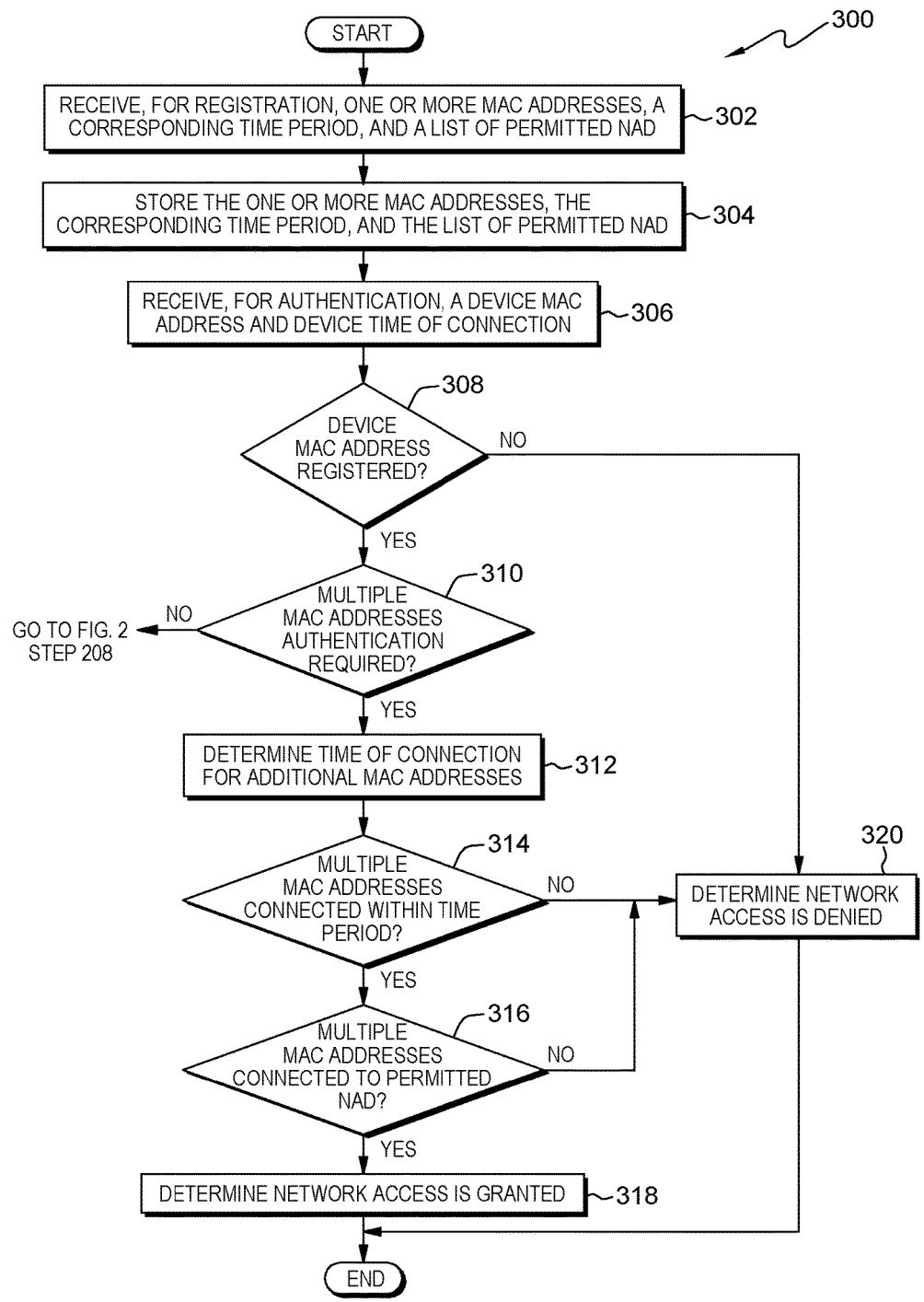
FIG. 3 is a flowchart depicting operational steps of a device authentication program, on a server computer within the distributed data processing environment of FIG. 1, in accordance with an embodiment of the present invention.

FIG. 3 depicts flowchart 300, illustrating operational steps of device authentication program 106, operating on security portal 104, within distributed data processing environment 100 of FIG. 1, in accordance with an embodiment of the present invention.

Device authentication program 106 receives one or more mac addresses, a corresponding time period, and a list of permitted network access devices for registration of a device (step 302). In some embodiments of the present invention, device authentication program 106 receives one or more mac addresses and corresponding time period information to register a security policy that establishes trust of a single device only if the one or more mac addresses appear on the network within the time period. For example, a single device may be identified using list of multiple mac addresses, such as a wireless mac address and a wired mac address. In these cases, both the wireless mac address and the wired mac address must be connected to the network within the corresponding time period. In other embodiments, device authentication program 106 receives one or more mac addresses and corresponding time period information to register a security policy that establishes trust of a single device only if the one or more mac addresses appear on one of the permitted network access devices within the time period. In some embodiments, the list of permitted network access devices may include an identifier of the specific network access device (e.g., serial number, mac address, or other appropriate identifier), an identifier of one or more locations (e.g., room or building numbers), or an identifier of one or more geographies (e.g., city or country), among other appropriate identifiers of the network access device or the location where the device is allowed to connect. In other embodiments, device authentication program 106 receives one or more unique identifiers and corresponding time period information for registration of a device. For example, unique identifiers may include a near-field communication unique identifier, or any other identifier that may be used to uniquely identify a device in a network. In other embodiments, device authentication program 106 may also receive additional fields as appropriate (e.g., requesting user, type of device, network access needed by subnet and/or Internet, among others). In yet other embodiments, device authentication program 106 may use all the registration information, including the additional fields, to establish an audit or accountability trail for use in case the security of the device becomes compromised later.

Device authentication program 106 stores the one or more mac addresses, the corresponding time period, and the list of permitted network access devices for registration of the device (step 304). In some embodiments of the present invention, device authentication program 106 may store the registration information, including the one or more mac addresses, the time period, and the list of permitted network access devices, in an internal database or storage (not shown). In other embodiments, device authentication program 106 may register the mac addresses and time period information for host-based authentication in security directory 108.

Device authentication program 106 receives a device mac address, a time of connection of the device for authentication, and an identifier of a network access device (step 306). In some embodiments of the present invention, once the device is connected to the network, at least one of the mac addresses and the time of connection of the device are sent to device authentication program 106 to determine whether the device should be allowed on the network. In some embodiments, network access device 112 receives the mac address of the device when the device is connected, determines a time of connection of the device, and sends the mac address of the device and the time of connection of the device to device authentication program 106. In other embodiments, device authentication device 106 receives an identifier of the network access device 112 to which the device was connected to determine whether the device should be allowed on the network. In this and other embodiments, the identifier of the network access device may include identification of the specific network access device (e.g., serial number, mac address, or other appropriate identifier), identification of one or more locations (e.g., room or building numbers), or identification of one or more geographies (e.g., city or country), among other appropriate identifiers of the network access device or the location where the device was connected. In yet other embodiments, device authentication program 106 may perform host-based authentication based on the mac address and time of connection of the device according to the time period established in the security policy.

Device authentication program 106 determines whether the mac address of the device is registered (step 308). In some embodiments of the present invention, device authentication program 106 verifies that the mac address of the device has been previously registered. For example, device authentication program 106 may search entries in a disk storage (not shown) or may query a database such as security directory 108 to retrieve the registration information associated with the mac address. If the mac address is not registered, device authentication program 106 continues execution to determine network access is denied (step 306, "NO" branch). If the mac address is registered, device authentication program 106 continues execution to determine whether network access should be granted to the device (step 306, "YES" branch).

Device authentication program 106 determines whether the device requires multiple mac addresses authentication, such as a wired mac address and a wireless mac address (step 310). If the device does not require multiple mac address authentication, device authentication program 106 continues execution to determine whether network access should be granted using a single mac address as disclosed in step 208 above (step 308, "NO" branch). If the device requires multiple mac address authentication, device authentication program 106 continues execution to determine whether the multiple mac addresses have been connected to the network (step 308, "YES" branch).

Device authentication program 106 determines the time of connection for the additional mac addresses and the identifiers of the network access devices (step 312). In some embodiments of the present invention, device authentication program 106 may first receive one of the mac addresses and periodically check whether the additional mac addresses connect to the network within the time period. For example, a user may connect to a wired network and may connect to a wireless network minutes later. In these cases, device authentication program 106 may periodically check the network to determine whether the additional mac addresses have been connected. In this and other embodiments, device authentication program 106 may also periodically check the identifier of the network access device that the additional mac addresses were connected to. In other embodiments, device authentication program 106 may wait until the additional mac address and the time of connection of the additional mac address is received. In these cases, device authentication program 106 may wait until a network access device 112 associated to the wireless network notifies that the mac address associated to the wireless network is connected to the network. In this and other embodiments, device authentication program 106 may also receive the identifier of the network access device that the additional mac addresses were connected to.

Device authentication program 106 determines whether the multiple mac addresses were connected within the time period (step 314). In some embodiments of the present invention, device authentication program 106 determines a time of connection of the device based on the time of connection of the multiple mac addresses and compares the time of connection of the device with the time period set in the security policy. If the time of connection of the device does not match the time period, device authentication program 106 continues execution to determine network access is denied (step 312, "NO" branch). For example, given a security policy with time period of "Apr. 17, 2017 between 9 am-11 am" and given a time of connection of the device of "Apr. 17, 2017 12:31 pm," device authentication program 106 continues execution to determine network access is denied to the device. In other embodiments, network access is denied if the multiple mac addresses are not connected to the network within the time period set in the security policy. For example, if wired and wireless mac addresses of a device are required for device authentication and only the wired mac address is connected to the network within the time period, network access is denied to the device. If the time of connection of the device matches the time period, device authentication program 106 continues execution to determine network access is granted (step 312, "YES" branch). For example, given a security policy with time period of "Apr. 17, 2017 between 9 am-11 am" and given a time of connection of the device of "Apr. 17, 2017 9:30 am," device authentication program 106 continues execution to determine network access is granted to the device.

Device authentication program 106 determines whether the identifiers of the network access devices corresponding to each of the multiple mac addresses are in the list of permitted network access devices (step 316). In some embodiments of the present invention, device authentication program 106 compares the identifiers of the network access devices with the list of permitted network access devices set in the security policy. If the identifiers of the network access device do not match the list of permitted network access devices, device authentication program 106 continues execution to determine network access is denied (step 208, "NO" branch). For example, given a security policy with list of permitted network access devices of "Armonk, N.Y., USA" and given an identifier of a network access device of "Markham, Ontario, CA," device authentication program 106 continues execution to determine network access is denied to the device. If the identifier of the network access device matches the list of permitted network access devices, device authentication program 106 continues execution to determine network access is granted (step 208, "YES" branch). For example, given a security policy with list of permitted network access devices of "Armonk, N.Y., USA" and given identifiers of the network access devices of "Armonk," device authentication program 106 continues execution to determine network access is granted to the device.

Device authentication program 106 determines network access is granted (step 318). Device authentication program 106 allows devices on the network only if the device is registered and the time of connection of the device, based on the time of connection of the multiple mac addresses, is within the time period set in the security policy. For example, if the user connects the registered device within the specified time window, the device may be permitted on the network by network access device 112 and appropriate access control may be applied. In other embodiments, device authentication program 106 allows a device on the network only if the devices are registered, the time of connection of the device is within the time period set in the security policy, and the multiple mac addresses are connected to network access devices listed in the security policy. In some embodiments of the present invention, device authentication program 106 determines network access is granted to a device for all future connections based on implementation of a security policy for initial connectivity. For example, a security policy for initial connectivity may require a user of the device to connect the device to the network for the first time within a predefined time period. In these cases, the device will still be authorized to access the network after the time period expires. In other embodiments, network access is granted to the device only within the time period. In these cases, the device will be denied access to the network after the time period expires even if the time of connection for initial connectivity was within the time period set in the security policy.

Device authentication program 106 determines network access is denied (step 320). Device authentication program 106 denies network access to unregistered devices. In some embodiments of the present invention, device authentication program 106 also denies network access to devices where the required mac addresses for authentication were not connected to the network within the time period set in the security policy. In other embodiments, device authentication program 106 denies network access to devices where the required mac addresses for authentication were not connected to the network within the time period set in the security policy or the multiple mac addresses were connected to at least one network access device not listed in the security policy. As explained above, in some embodiments of the present invention, device authentication program 106 determines network access based on implementation of a security policy for initial connectivity. In these cases, the device will only be authenticated for the network based on the first time that the device is connected to the network. In other embodiments, device authentication program 106 may mark the device as known and future access controls may be applied as needed. In yet other embodiments, if a registered device connects to the network outside of the time period set in the security policy, device authentication program 106 may deny network access until the device is re-registered. For example, if the time period expires or the device is connected prematurely, device authentication program 106 may issue a deny message and the device may need to be registered again. In still other embodiments, network access is denied after the time period expires even if the initial time of connection of the device was within the time period.

Figure 4:
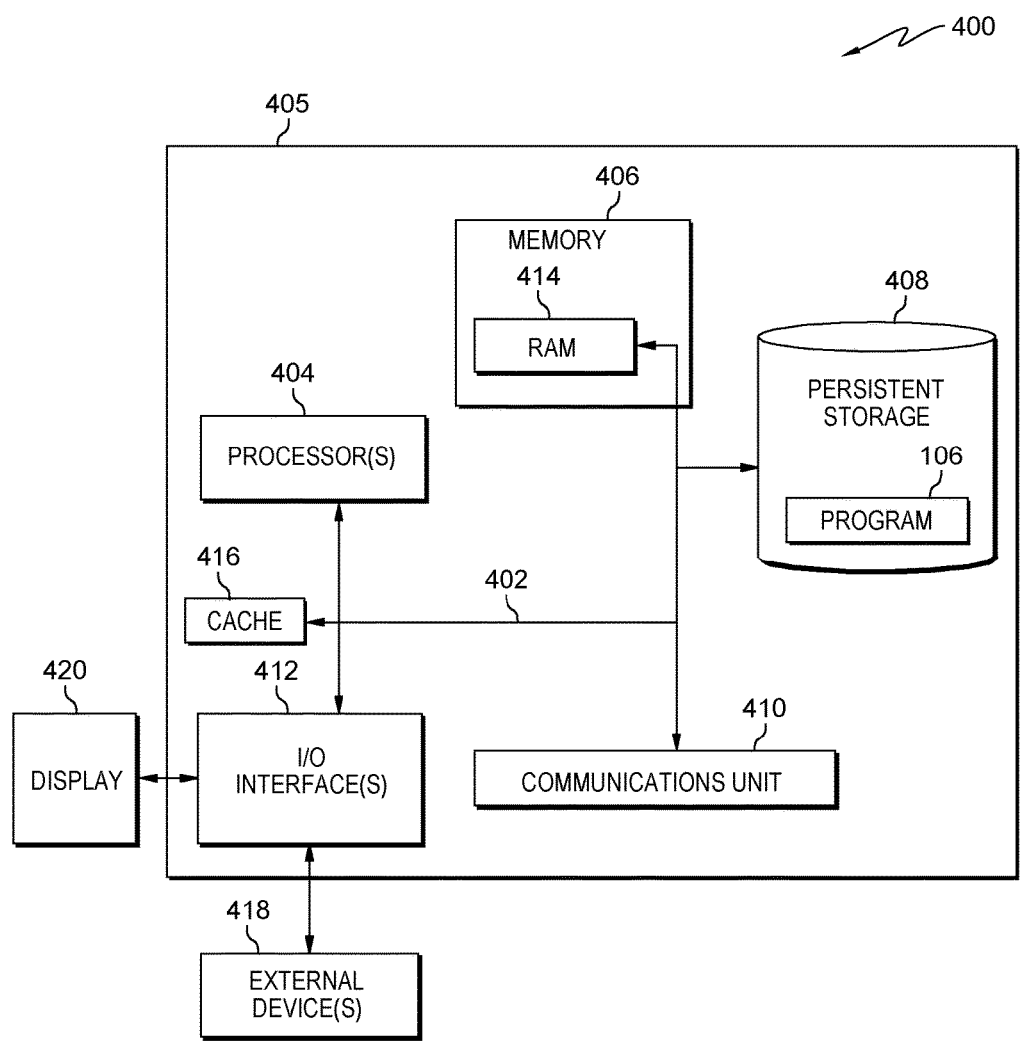
FIG. 4 depicts a block diagram of components of the server computer executing the device authentication program within the distributed data processing environment of FIG. 1, in accordance with an embodiment of the present invention.

FIG. 4 depicts a block diagram of computer system 400, including components of computing device 405 which is similar to security portal 104, and capable of operating device authentication program 106, within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Computing device 405 and security portal 104 include communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Device authentication program 106 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Device authentication program 106 may be downloaded to persistent storage 408 through communications unit 410.

I/O interface(s) 412 allows for input and output of data with other devices that may be accessible to computing device 405 and security portal 104, such as IoT device 110, network access device 112, user workstation 114, and other computing devices (not shown). For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., device authentication program 106 can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
   receiving, by one or more processors, a security policy comprising at least a first media access control ("mac") address, a second mac address, and a corresponding time period for determining network access for a first device, wherein the first mac address corresponds to a first network access device of the first device and the second mac address corresponds to a second network access device of the first device;
   receiving, by one or more processors, a third mac address and a corresponding time of connection of the third mac address;
   receiving, by one or more processors, a fourth mac address and a corresponding time of connection of the fourth mac address;
   determining, by one or more processors, the third mac address is the first mac address and the fourth mac address is the second mac address; and
   determining, by one or more processors, to grant network access to the first device based on: (i) whether the time of connection of the third mac address is within the corresponding time period, and (ii) whether the time of connection of the fourth mac address is within the corresponding time period.

2. The method of claim 1, wherein receiving, by one or more processors, the security policy comprising at least the first media access control ("mac") address, the second mac address, and the corresponding time period for determining network access for the first device further comprises:
   receiving, by one or more processors, user credentials for user login to a device registration portal;
   determining, by one or more processors, a user authentication based on the user credentials;
   receiving, by one or more processors, the first mac address, the second mac address, and the corresponding time period for registration of the first device; and
   storing, by one or more processors, the security policy comprising the first mac address, the second mac address, and the corresponding time period.

3. The method of claim 1, wherein: the security policy further comprises a list of permitted network access devices for registration of the first device; and wherein determining, by one or more processors, to grant network access to the first device based on: (i) whether the time of connection of the third mac address is within the corresponding time period, and (ii) whether the time of connection of the fourth mac address is within the corresponding time period further comprises:
   receiving, by one or more processors, an identifier of a network access device for authentication of the first device; and
   determining, by one or more processors, to grant network access to the first device based on whether the identifier of the network access device is within the list of permitted network access devices.

4. The method of claim 3, wherein the list of permitted network access devices comprises one or more network access devices through which the first device is permitted to access a network.

5. The method of claim 1, wherein the security policy further comprises a device type.

6. The method of claim 1, wherein the security policy further comprises an identification of a requesting user.

7. A computer program product comprising:
   one or more computer readable storage media; and
   program instructions stored on the one or more computer readable storage media, the program instructions comprising:
      program instructions to receive a security policy comprising at least a first media access control ("mac") address, a second mac address, and a corresponding time period for determining network access for a first device, wherein the first mac address corresponds to a first network access device of the first device and the second mac address corresponds to a second network access device of the first device;
      program instructions to receive a third mac address and a corresponding time of connection of the third mac address;
      program instruction to receive a fourth mac address and a corresponding time of connection of the fourth mac address;
      program instructions to determine the third mac address is the first mac address and the fourth mac address is the second mac address; and
      program instructions to determine to grant network access to the first device based on: (i) whether the time of connection of the third mac address is within the corresponding time period, and (ii) whether the time of connection of the fourth mac address is within the corresponding time period.

8. The computer program product of claim 7, wherein the program instructions to receive the security policy comprising at least the first media access control ("mac") address, the second mac address, and the corresponding time period for determining network access for the first device further comprises:
   program instructions to receive user credentials for user login to a device registration portal;
   program instructions to determine a user authentication based on the user credentials;
   program instructions to receive the first mac address, the second mac address, and the corresponding time period for registration of the first device; and
   program instructions to store the security policy comprising the first mac address, the second mac address, and the corresponding time period.

9. The computer program product of claim 7, wherein: the security policy further comprises a list of permitted network access devices for registration of the first device; and wherein the program instructions to determine to grant network access to the first device based on: (i) whether the time of connection of the third mac address is within the corresponding time period, and (ii) whether the time of connection of the fourth mac address is within the corresponding time period further comprises:
   program instructions to receive an identifier of a network access device for authentication of the first device; and
   program instructions to determine to grant network access to the first device based on whether the identifier of the network access device is within the list of permitted network access devices.

10. The computer program product of claim 9, wherein the list of permitted network access devices comprises one or more network access devices through which the first device is permitted to access a network.

11. The computer program product of claim 7, wherein the security policy further comprises a device type.

12. The computer program product of claim 7, wherein the security policy further comprises an identification of a requesting user.

13. A computer system comprising:
one or more computer processors;
one or more computer readable media; and
program instructions, stored on the one or more computer readable media for execution by at least one of the one or more processors, the program instructions comprising:
program instructions to receive a security policy comprising at least a first media access control ("mac") address, a second mac address, and a corresponding time period for determining network access for a first device, wherein the first mac address corresponds to a first network access device of the first device and the second mac address corresponds to a second network access device of the first device;
program instructions to receive a third mac address and a corresponding time of connection of the third mac address;
program instruction to receive a fourth mac address and a corresponding time of connection of the fourth mac address;
program instructions to determine the third mac address is the first mac address and the fourth mac address is the second mac address; and
program instructions to determine to grant network access to the first device based on: (i) whether the time of connection of the third mac address is within the corresponding time period, and (ii) whether the time of connection of the fourth mac address is within the corresponding time period.

14. The computer system of claim 13, wherein the program instructions to receive the security policy comprising at least the first media access control ("mac") address, the second mac address, and the corresponding time period for determining network access for the first device further comprises:
program instructions to receive user credentials for user login to a device registration portal;
program instructions to determine a user authentication based on the user credentials;
program instructions to receive the first mac address, the second mac address, and the corresponding time period for registration of the first device; and
program instructions to store the security policy comprising the first mac address, the second mac address, and the corresponding time period.

15. The computer system of claim 13, wherein the security policy further comprises a list of permitted network access devices for registration of the device; and wherein the program instructions to determine to grant network access to the first device based on: (i) whether the time of connection of the third mac address is within the corresponding time period, and (ii) whether the time of connection of the fourth mac address is within the corresponding time period further comprises:
program instructions to receive an identifier of a network access device for authentication of the first device; and
program instructions to determine to grant network access to the first device based on whether the identifier of the network access device is within the list of permitted network access device.

16. The computer system of claim 15, wherein the list of permitted network access devices comprises one or more network access devices through which the first device is allowed access a network.

17. The computer system of claim 13, wherein the security policy further comprises a device type.

* * * * *